US012405519B2

(12) United States Patent
Takeuchi et al.

(10) Patent No.: US 12,405,519 B2
(45) Date of Patent: Sep. 2, 2025

(54) LENS RETAINING DEVICE AND PROJECTION DISPLAY APPARATUS

(71) Applicant: Panasonic Intellectual Property Management Co., Ltd., Osaka (JP)

(72) Inventors: Junichi Takeuchi, Osaka (JP); Atsushi Takagi, Osaka (JP); Kohei Ueyama, Osaka (JP); Kouji Tokura, Hyogo (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 631 days.

(21) Appl. No.: 17/743,929

(22) Filed: May 13, 2022

(65) Prior Publication Data

US 2022/0373872 A1 Nov. 24, 2022

(30) Foreign Application Priority Data

May 24, 2021 (JP) .................. 2021-086918

(51) Int. Cl.
*G03B 21/14* (2006.01)
(52) U.S. Cl.
CPC ................. *G03B 21/142* (2013.01)
(58) Field of Classification Search
CPC ..... G03B 21/142; G03B 21/145; G03B 21/14
See application file for complete search history.

(56) References Cited

U.S. PATENT DOCUMENTS

2018/0314138 A1 11/2018 Inui et al.
2021/0240062 A1* 8/2021 Hirasawa ............... G02B 7/005

FOREIGN PATENT DOCUMENTS

| JP | 2005-128253 | 5/2005 |
|---|---|---|
| JP | 2009-271141 | 11/2009 |
| JP | 2010-72456 | 4/2010 |
| JP | 2012-255911 | 12/2012 |
| JP | 2015-14666 | 1/2015 |
| WO | 2017/064794 | 4/2017 |
| WO | 2020/044955 | 3/2020 |

OTHER PUBLICATIONS

Office Action issued Mar. 5, 2025 in corresponding Japanese Patent Application No. 2021-086918, with English-language Translation.

\* cited by examiner

*Primary Examiner* — Ryan D Howard
(74) *Attorney, Agent, or Firm* — Wenderoth, Lind & Ponack, L.L.P.

(57) ABSTRACT

A lens retaining device includes a first shifter and a second shifter. The first shifter holds a lens and moves in a first direction perpendicular to an optical axis direction of the lens. The second shifter supports the first shifter and moves in a second direction perpendicular to the optical axis direction and the first direction. The first shifter includes a first main body moves in the first direction, a lens retainer that is provided on the first main body and retains the lens, and a first drive portion that moves the first main body. The lens retainer is integrally formed with the first main body.

10 Claims, 7 Drawing Sheets

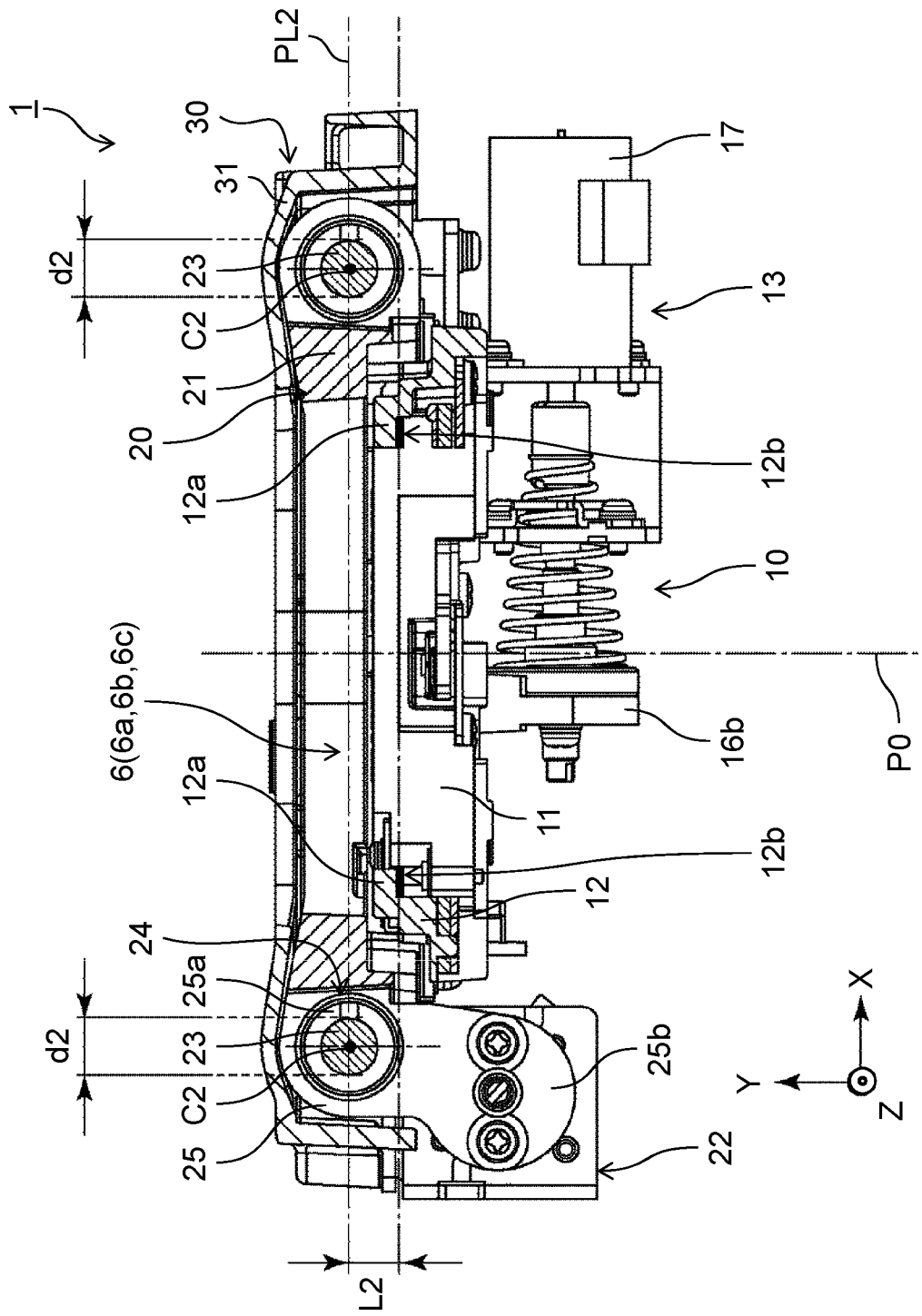

LENS RETAINING DEVICE AND PROJECTION DISPLAY APPARATUS

BACKGROUND

1. Technical Field

The present disclosure relates to a lens retaining device and a projection display apparatus.

2. Description of the Related Art

Patent Literature (PTL) 1 discloses a projector. The projector described in PTL 1 includes a lens shift mechanism that can move a projection lens in a direction perpendicular to the optical axis direction.
PTL 1 is Unexamined Japanese Patent Publication No. 2015-14666.

SUMMARY

However, the device described in PTL 1 still has room for improvement in terms of improvement in lens position accuracy.

An object of the present disclosure is to provide a lens retaining device and a projection display apparatus with improved lens position accuracy.

A lens retaining device according to one aspect of the present disclosure includes: a first shifter that holds a lens and moves in a first direction perpendicular to an optical axis direction of the lens; and a second shifter that supports the first shifter and moves in a second direction perpendicular to the optical axis direction and the first direction. The first shifter includes: a first main body moves in the first direction; a lens retainer that is provided on the first main body and retains the lens; and a first drive portion that moves the first main body. The lens retainer is integrally formed with the first main body.

A projection display apparatus according to one aspect of the present disclosure includes the lens retaining device according to the above aspect.

The present disclosure can provide a lens retaining device and a projection display apparatus with improved lens position accuracy.

BRIEF DESCRIPTION OF THE DRAWINGS

FIG. 7 is a cross-sectional view of the lens retaining device of FIG. 4 taken along line VII-VII.

DETAILED DESCRIPTIONS

Hereinafter, an exemplary embodiment will be described in detail with reference to the drawings as appropriate. However, unnecessarily detailed descriptions may be omitted. For example, a detailed description on an already well-known matter and a redundant description on the substantially same configuration may be omitted. This is to avoid the following descriptions to be unnecessarily redundant and to facilitate those skilled in the art to understand the following descriptions.

Note that, the accompanying drawings and the following descriptions are provided to facilitate those skilled in the art to sufficiently understand the present disclosure, and are not intended to limit the subject matter described in the claims.

First Exemplary Embodiment

[1-1. Configuration of Projection Display Apparatus]

Figure 1:
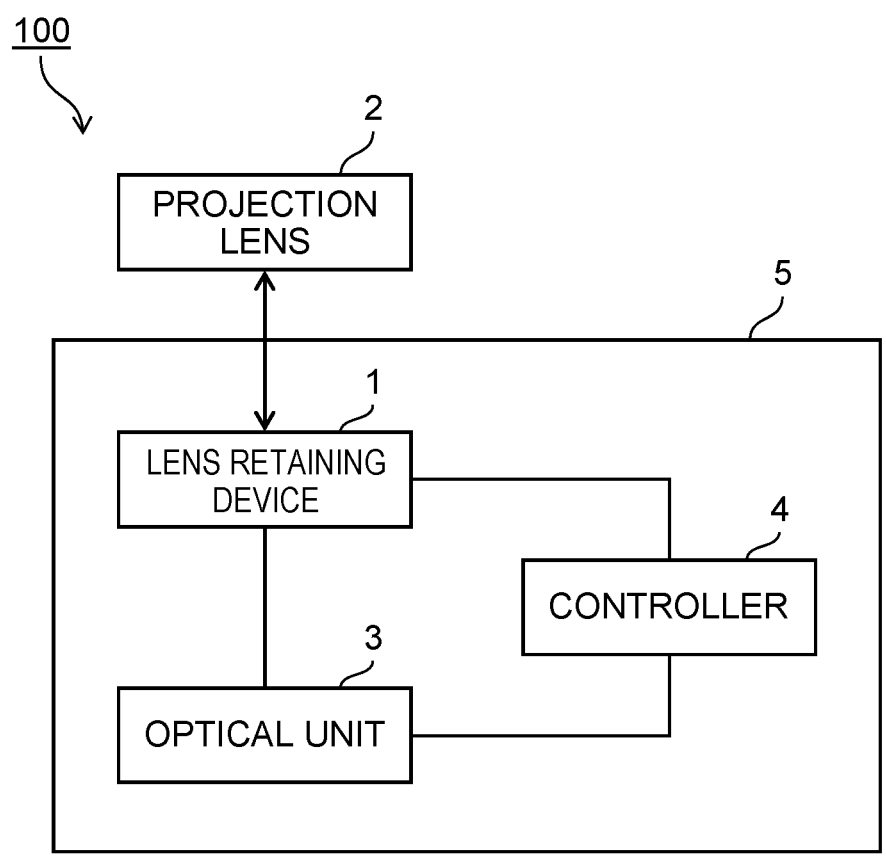
FIG. 1 is a block diagram illustrating a schematic configuration of a projection display apparatus according to a first exemplary embodiment.

FIG. 1 is a block diagram illustrating a schematic configuration of projection display apparatus 100 according to a first exemplary embodiment. As illustrated in FIG. 1, projection display apparatus 100 includes lens retaining device 1, projection lens 2, optical unit 3, and controller 4. Lens retaining device 1, optical unit 3, and controller 4 are housed in housing 5. Note that, projection display apparatus 100 projects an image onto a projection target such as a screen or a building.

Lens retaining device 1 retains projection lens 2 and moves projection lens 2. Lens retaining device 1 includes a retaining mechanism that retains projection lens 2 and a shift mechanism that moves projection lens 2. In lens retaining device 1, the retaining mechanism and the shift mechanism are integrally configured.

Figure 2:
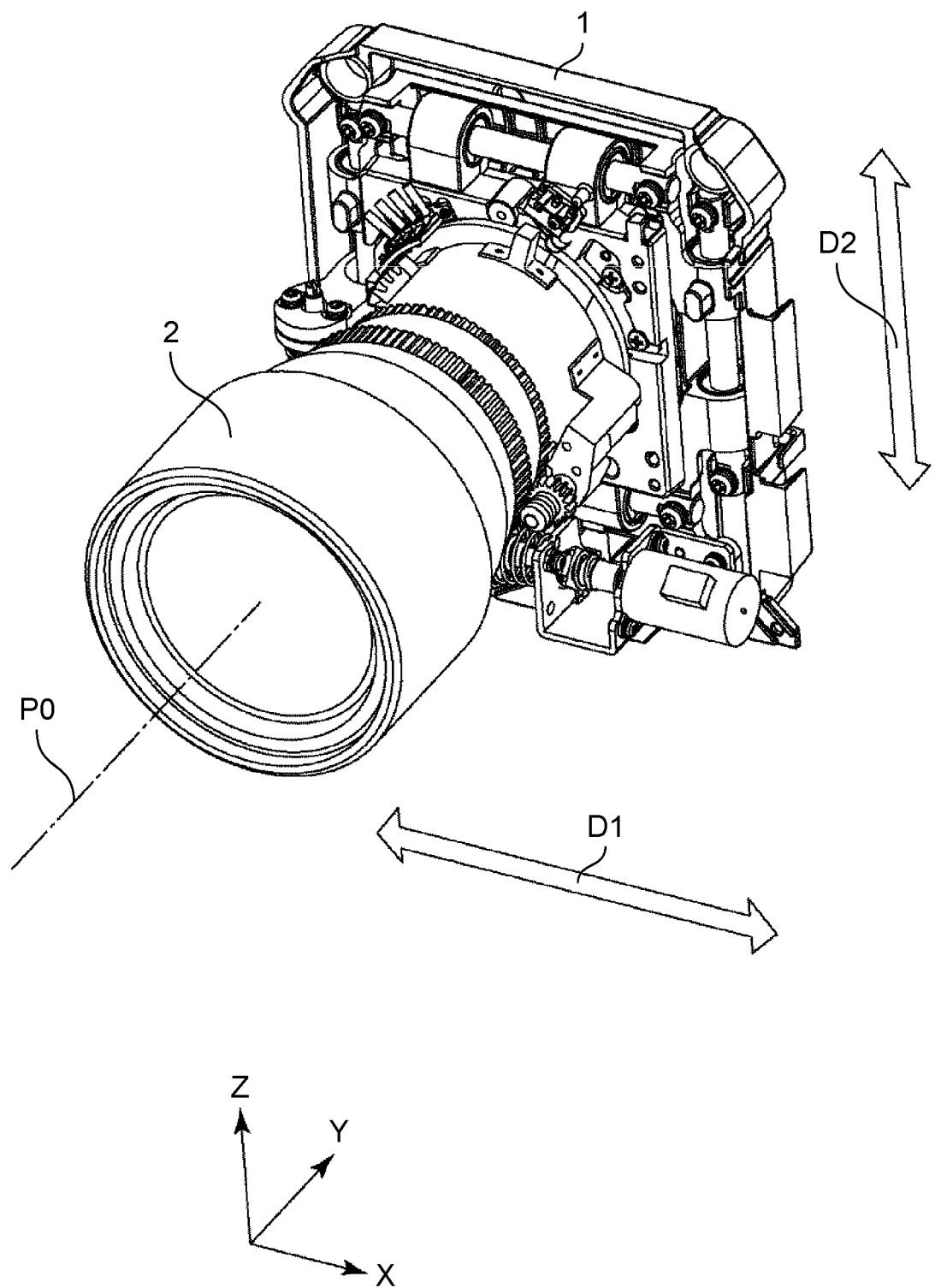
FIG. 2 is a diagram illustrating a lens retaining device to which a projection lens is attached.
Figure 3:
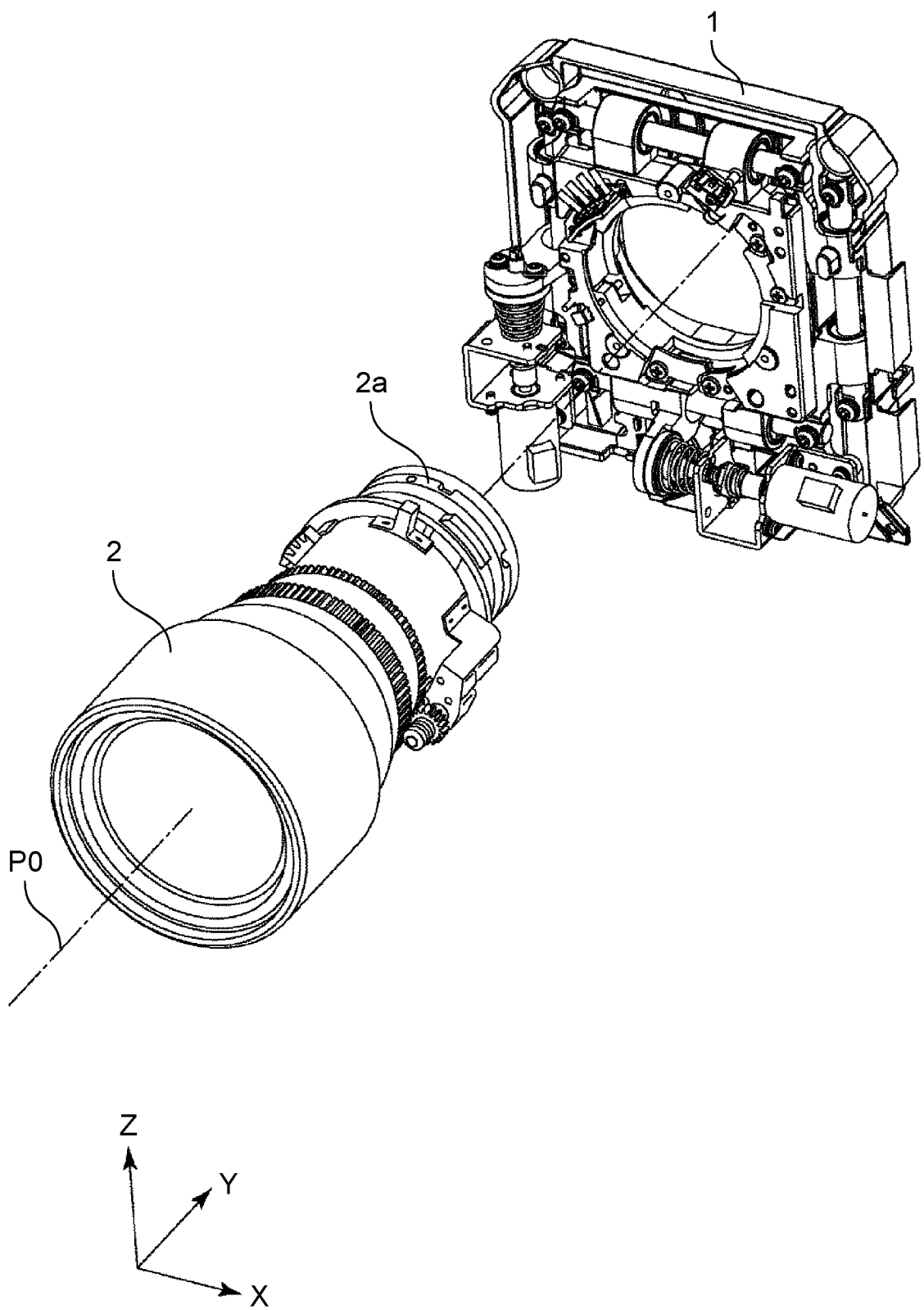
FIG. 3 is a diagram illustrating the lens retaining device from which the projection lens is removed.

FIG. 2 illustrates lens retaining device 1 to which projection lens 2 is attached, and FIG. 3 illustrates lens retaining device 1 from which projection lens 2 is removed. Note that, in FIGS. 2 and 3, components of projection display apparatus 100 other than lens retaining device 1 and projection lens 2 are not shown for ease of description. Further, X, Y, and Z-directions in the drawing respectively indicate a lateral direction, a thickness direction, and a vertical direction of lens retaining device 1.

As illustrated in FIGS. 2 and 3, the retaining mechanism detachably retains an end side of projection lens 2. Specifically, the retaining mechanism retains projection lens 2 by engaging with engagement portion 2a provided at an end of projection lens 2. Further, projection lens 2 is removed from the retaining mechanism by releasing the engagement between the retaining mechanism and engagement portion 2a of projection lens 2. Engagement portion 2a is configured with, for example, a plurality of plate-shaped protrusions protruding outward at a peripheral edge of projection lens 2. The plurality of protrusions are provided at equal intervals on the outer periphery of projection lens 2.

The shift mechanism moves projection lens 2 while retaining projection lens 2. Specifically, the shift mechanism moves projection lens 2 in a first direction D1 and a second direction D2 that are perpendicular to a direction in which optical axis P0 of projection lens 2 extends (hereinafter, referred to as an "optical axis direction"). In the present exemplary embodiment, the optical axis direction represents the Y-direction, the first direction D1 represents the X-direction (horizontal direction), and the second direction D2 represents the Z-direction (vertical direction).

Projection lens 2 is a lens that enlarges image light and projects the image light onto a projection target. Projection lens 2 has a cylindrical shape having a first end and a second end. Projection lens 2 has engagement portion 2a provided on the second end side, and engagement portion 2a engages with lens retaining device 1.

Optical unit 3 includes a light source device and a light modulation device. The light source device is a device that radiates light such as semiconductor laser. The light modulation device is, for example, a liquid crystal display element or a digital micromirror device (DMD).

Controller 4 controls lens retaining device 1 and optical unit 3. Controller 4 can be implemented by a semiconductor device or the like. Controller 4 may be configured with, for example, a microcomputer, a central processing unit (CPU), a microprocessor unit (MPU), a graphics processor unit (GPU), a digital signal processor (DSP), a field-programmable gate array (FPGA), or an application specific integrated circuit (ASIC). A function of controller 4 may be configured only with hardware, or may be implemented by a combination of hardware and software. Controller 4 reads out data and a program stored in a storage such as a memory to perform various types of arithmetic processing and thus implements a predetermined function.

[1-2. Configuration of Lens Retaining Device]

Figure 4:
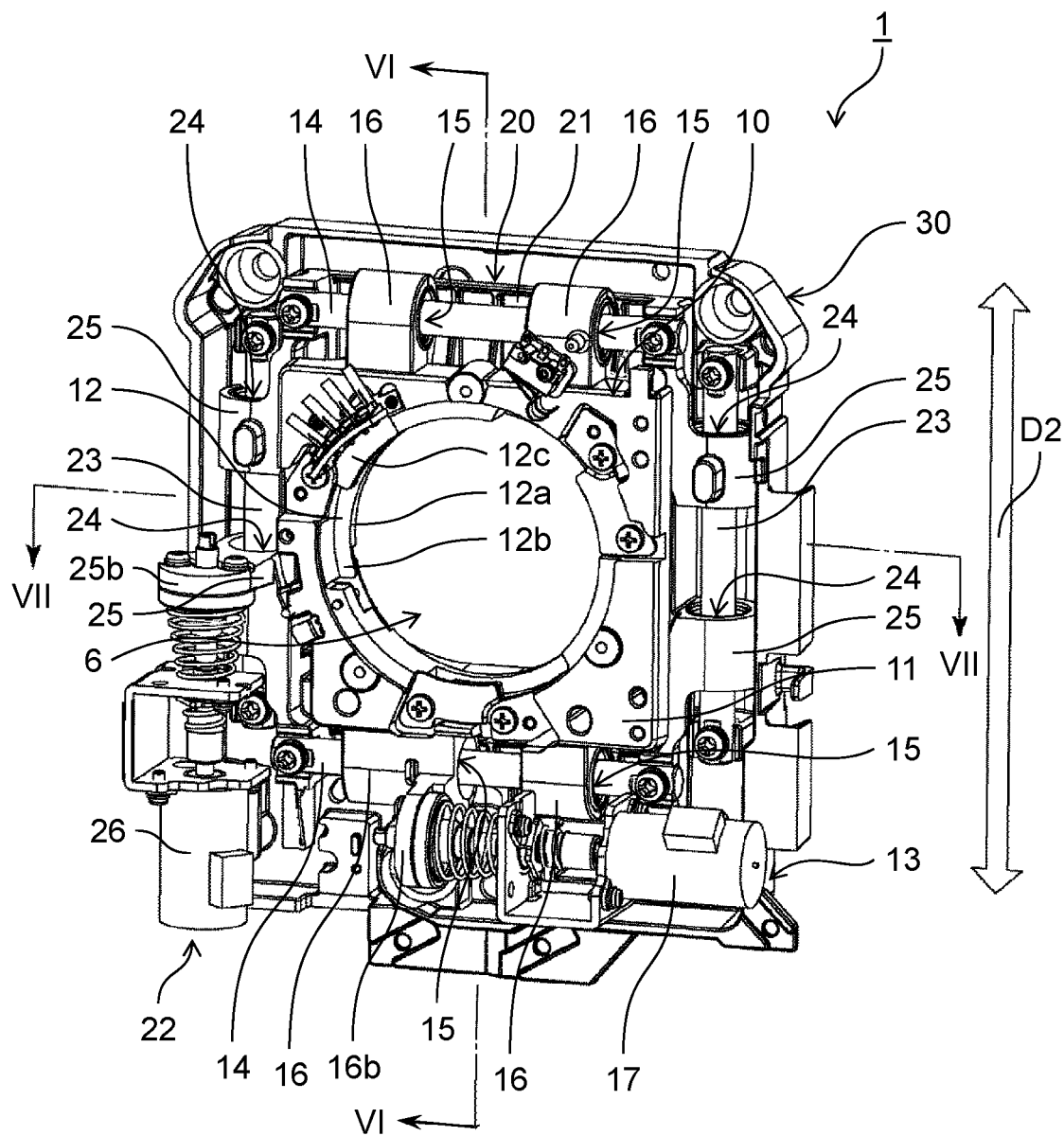
FIG. 4 is a perspective view of the lens retaining device according to the first exemplary embodiment.
Figure 5:
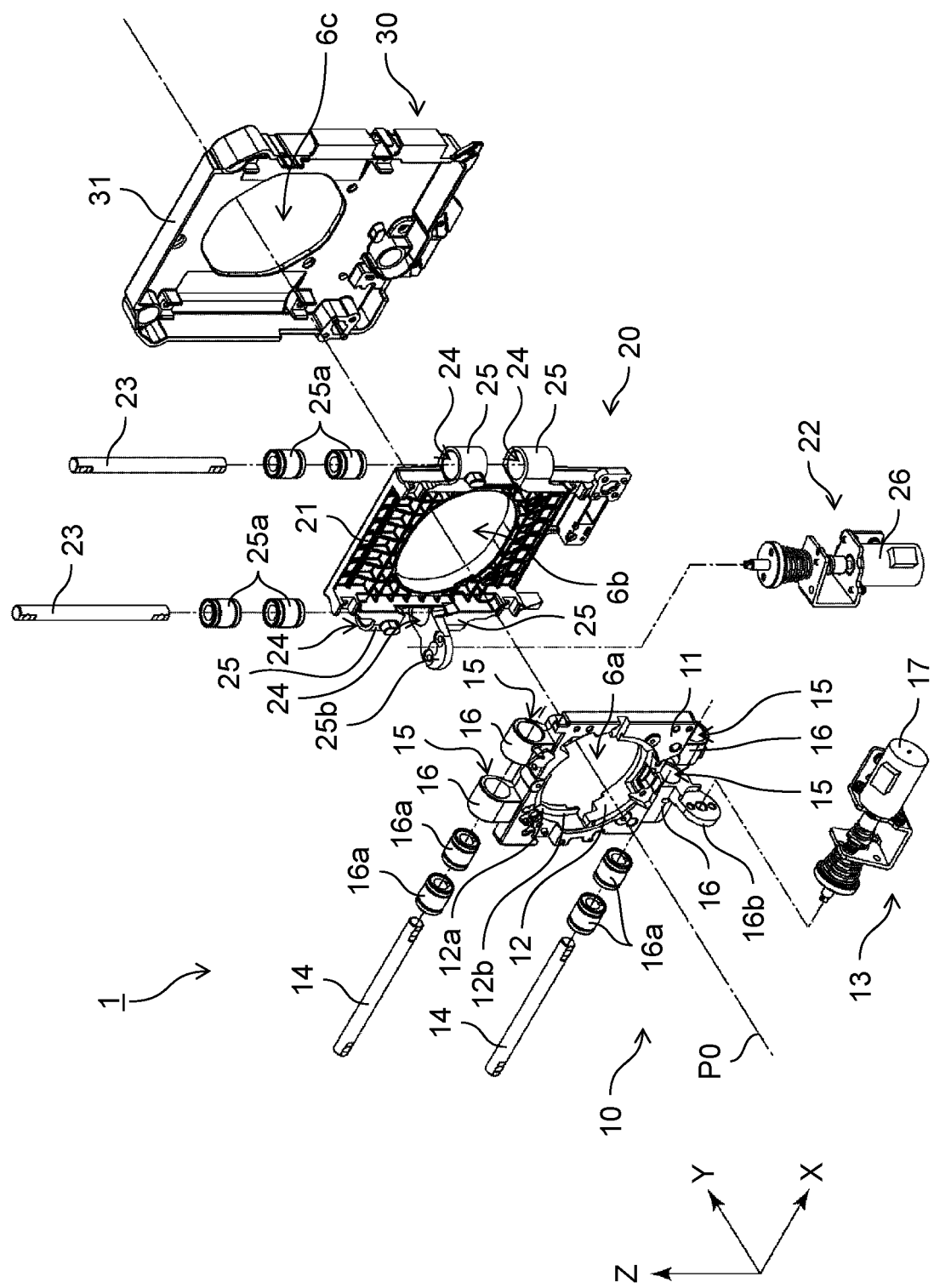
FIG. 5 is a schematic exploded view of the lens retaining device of FIG. 4.

FIG. 4 is a perspective view of lens retaining device 1 according to the first exemplary embodiment. FIG. 5 is a schematic exploded view of the lens retaining device of FIG. 4. FIG. 5 illustrate main component parts of lens retaining device 1, and some elements are not illustrated.

As illustrated in FIGS. 4 and 5, lens retaining device 1 includes first shifter 10, second shifter 20, and base 30. First shifter 10 is supported by second shifter 20, and second shifter 20 is supported by base 30. In addition, lens retaining device 1 is provided with through hole 6 passing through first shifter 10, second shifter 20, and base 30. Image light passes through through hole 6.

First shifter 10 retains projection lens 2 and moves in the first direction D1 perpendicular to the optical axis direction of projection lens 2. First shifter 10 is supported by second shifter 20 movably in the first direction D1. First shifter 10 includes: the retaining mechanism that retains projection lens 2; and the shift mechanism that moves in the first direction D1 perpendicular to the optical axis direction of projection lens 2. First shifter 10 integrally constitutes the retaining mechanism and the shift mechanism. Specifically, first shifter 10 includes first main body 11, lens retainer 12, first drive portion 13, and first shafts 14, wherein lens retainer 12 and first main body 11 are integrally provided.

In the present exemplary embodiment, first shafts 14 are fixed to second shifter 20, and function as guides when first main body 11 moves. That is, first main body 11 is moved along first shafts 14 by first drive portion 13.

First main body 11 and lens retainer 12 are made of, for example, a metal material. That is, first main body 11 and lens retainer 12 are integrally formed of a metal material. The metal material includes, for example, an aluminum alloy or a magnesium alloy. In other words, first main body 11 and lens retainer 12 may be integrally formed of an aluminum alloy. Alternatively, first main body 11 and lens retainer 12 may be integrally formed of a magnesium alloy.

First main body 11 is a plate-shaped member movable in the first direction D1. First main body 11 has, for example, a rectangular shape when viewed in the optical axis direction. In addition, first through hole 6a having a circular shape is provided at the center of first main body 11 when viewed in the optical axis direction.

First main body 11 includes first shaft retainers 16 each disposed along the first direction D1 and provided with first shaft hole 15. In the present exemplary embodiment, first main body 11 includes four first shaft retainers 16. Four first shaft retainers 16 are provided at both ends of first main body 11 in the vertical direction (Z-direction). Specifically, two of first shaft retainers 16 are provided at a first end of first main body 11 in the vertical direction (Z-direction), and two of first shaft retainers 16 are provided at a second end of first main body 11 in the vertical direction (Z-direction).

First shaft holes 15 are through holes having a circular shape when viewed in the first direction D1. First shafts 14 are disposed in first shaft holes 15. In the present exemplary embodiment, first bearing 16a is disposed in each of first shaft holes 15. Each of first bearings 16a is disposed on first shaft retainer 16 in one of first shaft holes 15. First shafts 14 are disposed in first bearings 16a.

First shaft retainers 16 are provided to protrude from the ends of first main body 11 in the vertical direction (Z-direction). On first shaft retainers 16 that are connected to first drive portion 13 and are disposed on the first end side in the vertical direction (Z-direction) of first main body 11, there is provided first connection portion 16b that is connected to first drive portion 13. First connection portion 16b is a plate-shaped member protruding from first shaft retainers 16. Two first shaft retainers 16 disposed on one end side of first main body 11 in the vertical direction (Z-direction) are arranged at an interval therebetween in the lateral direction (X-direction) of first main body 11.

Lens retainer 12 retains projection lens 2. Lens retainer 12 retains projection lens 2 by engaging with engagement portion 2a provided at the end side of projection lens 2. Lens retainer 12 is provided on first main body 11. Specifically, lens retainer 12 is provided on an inner wall that defines first through hole 6a provided in first main body 11.

Lens retainer 12 has a plurality of ribs 12a having a plate shape protruding from the inner wall of first through hole 6a toward the inside of first main body 11. The plurality of ribs 12a are provided at equal intervals when viewed in the optical axis direction. In the present exemplary embodiment, the plurality of ribs 12a include three ribs 12a.

The plurality of ribs 12a are provided on the side of first main body 11 where second shifter 20 is disposed. Each of the plurality of ribs 12a has contact surface 12b in contact with projection lens 2. Contact surfaces 12b are perpendicular to the optical axis direction of projection lens 2 and are in contact with engagement portion 2a of projection lens 2.

In addition, lens retainer 12 includes a plurality of locking portions 12c. The plurality of locking portions 12c are provided at equal intervals when viewed in the optical axis direction. In the present exemplary embodiment, the plurality of locking portions 12c includes three locking portions 12c.

The plurality of locking portions 12c lock engagement portions 2a, of projection lens 2, disposed on contact surfaces 12b of plurality of ribs 12a. In the present exemplary embodiment, engagement portion 2a is formed of a plurality of protrusions. The plurality of locking portions 12c lock the plurality of protrusions disposed on contact surfaces 12b of the plurality of ribs 12a. To attach projection lens 2 to lens retainer 12, engagement portion 2a of projection lens 2, that is, the plurality of protrusions are inserted into first through hole 6a, so that engagement portion 2a of projection lens 2 is brought into contact with contact surfaces 12b of the plurality of ribs 12a. Next, projection lens 2 is rotated about the optical axis to slidingly move engagement portion 2a on contact surfaces 12b, thereby engaging engagement portion 2a with the plurality of locking portions 12c. As a result, engagement portion 2a of projection lens 2, that is, the plurality of protrusions are locked and fixed by the plurality of locking portions 12c. To detach projection lens 2, a procedure reverse to the operation of attaching projection lens 2 is performed.

First drive portion 13 moves first main body 11 in the first direction D1. First drive portion 13 has first actuator 17 that applies force to move first main body 11 in the first direction D1.

First actuator 17 moves first main body 11 along first shafts 14 in the first direction D1 by applying force to first main body 11. As first actuator 17, a motor or the like can be used, for example. First actuator 17 is connected to first connection portion 16*b* of first shaft retainers 16 provided on first main body 11. First actuator 17 applies force to first connection portion 16*b* in the first direction D1. With this arrangement, first main body 11 moves in the first direction D1, being guided by first shafts 14. First actuator 17 is connected to first connection portion 16*b* via, for example, a ball screw mechanism or a rotation transmission gear mechanism. The ball screw mechanism is, for example, a mechanism having a screw portion and a nut portion. The rotation transmission gear mechanism is, for example, a mechanism in which a plurality of gears are combined. First actuator 17 is controlled by, for example, controller 4.

First shafts 14 are columnar shafts disposed in first shaft holes 15 of first shaft retainers 16. First shafts 14 extend in the first direction D1. First shafts 14 are disposed in first bearings 16*a* and are disposed in first shaft holes 15 via first bearings 16*a*. First shafts 14 are slidably supported on first bearings 16*a* by first shaft retainers 16. First shafts 14 are fixed to second shifter 20 and function as a guide when first main body 11 moves. Since first shifter 10 moves, being guided by first shafts 14 fixed to second shifter 20, first shifter 10 moves in the first direction D1 with respect to second shifter 20. Therefore, even when first shifter 10 moves in the first direction D1, second shifter 20 does not move in the first direction D1.

<Second Shifter>

Second shifter 20 supports first shifter 10 and moves in the second direction D2 that is perpendicular to the optical axis direction and the first direction D1. Second shifter 20 supports first shifter 10 to be movable in the first direction D1. Further, second shifter 20 is supported by base 30 movably in the second direction D2. Therefore, second shifter 20 moves in the second direction D2 together with first shifter 10 with respect to base 30. Second shifter 20 includes a second main body 21, second drive portion 22, and second shafts 23.

Second main body 21 is a plate-shaped member movable in the second direction D2. Second main body 21 has, for example, a rectangular shape when viewed in the optical axis direction. In addition, at the center of second main body 21 when viewed in the optical axis direction, there is provided second through hole 6*b* having a circular shape. Second through hole 6*b* is provided at a position overlapping, when viewed in the optical axis direction, first through hole 6*a* and communicates with first through hole 6*a*.

Second main body 21 includes second shaft retainers 25 each disposed along the second direction D2 and provided with second shaft hole 24. In the present exemplary embodiment, second main body 21 includes four second shaft retainers 25. Four second shaft retainers 25 are provided at both ends of second main body 21 in the lateral direction (X-direction). Specifically, two of second shaft retainers 25 are provided at a first end of second main body 21 in the lateral direction (X-direction), and two of second shaft retainer 25 are provided at a second end of second main body 21 in the lateral direction (X-direction).

Second shaft holes 24 are through holes having a circular shape when viewed in the second direction D2. Second shafts 23 are disposed in second shaft holes 24. In the present exemplary embodiment, second bearing 25*a* is disposed in each second shaft hole 24. Second bearing 25*a* is disposed on second shaft retainer 25 in one of second shaft holes 24. Second shafts 23 are disposed in second bearings 25*a*.

Second shaft retainers 25 are provided to protrude from the ends of second main body 21 in the lateral direction (X-direction). On second shaft retainers 25 that are connected to second drive portion 22 and are disposed on the first end side in the lateral direction (X-direction) of second main body 21, there is provided second connection portion 25*b* connected to second drive portion 22. Second connection portion 25*b* is a plate-shaped member protruding from second shaft retainers 25. Two second shaft retainers 25 disposed on one end side of second main body 21 in the lateral direction (X-direction) are arranged at an interval therebetween in the vertical direction (Z-direction) of second main body 21.

Second drive portion 22 moves second main body 21 in the second direction D2. Second drive portion 22 has second actuator 26 that applies force to move second main body 21 in the second direction D2.

Second actuator 26 moves second main body 21 along second shafts 23 in the second direction D2 by applying force to second main body 21. Second actuator 26 may be similar to or different from first actuator 17. Second actuator 26 is connected to second connection portion 25*b* of second shaft retainers 25 provided on second main body 21. Second actuator 26 applies force to second connection portion 25*b* in the second direction D2. With this arrangement, second main body 21 moves in the second direction D2, being guided by second shafts 23. Second actuator 26 is controlled by, for example, controller 4.

Second shafts 23 are columnar shafts disposed in second shaft holes 24 of second shaft retainers 25. Second shafts 23 extend in the second direction D2. Second shafts 23 are disposed in second bearings 25*a* and are disposed in second shaft holes 24 via second bearings 25*a*. Second shafts 23 are slidably supported on second bearings 25*a* by second shaft retainer 25. In the present exemplary embodiment, second shafts 23 are fixed to base 30 and function as guides when second main body 21 moves. Since second shifter 20 moves, being guided by second shafts 23 fixed to base 30, second shifter 20 moves in the second direction D2 with respect to base 30. First shifter 10 is fixed to second main body 21 via first shafts 14. Therefore, when second main body 21 moves in the second direction D2, first shifter 10 also moves in the second direction D2 together with second main body 21.

<Base>

Base 30 supports second shifter 20. Base 30 supports second shifter 20 to be movable in the second direction D2. Base 30 includes base main body 31.

Base main body 31 is a plate-shaped member. Base main body 31 has, for example, a rectangular shape when viewed in the optical axis direction. In addition, third through hole 6*c* having a circular shape is provided at the center of base main body 31 when viewed in the optical axis direction. Third through hole 6*c* is provided at a position overlapping, when viewed in the optical axis direction, first through hole 6*a* and second through hole 6*b*, and communicates with first through hole 6*a* and second through hole 6*b*. First through hole 6*a*, second through hole 6*b*, and third through hole 6*c* form through hole 6 of lens retaining device 1.

Figure 6:
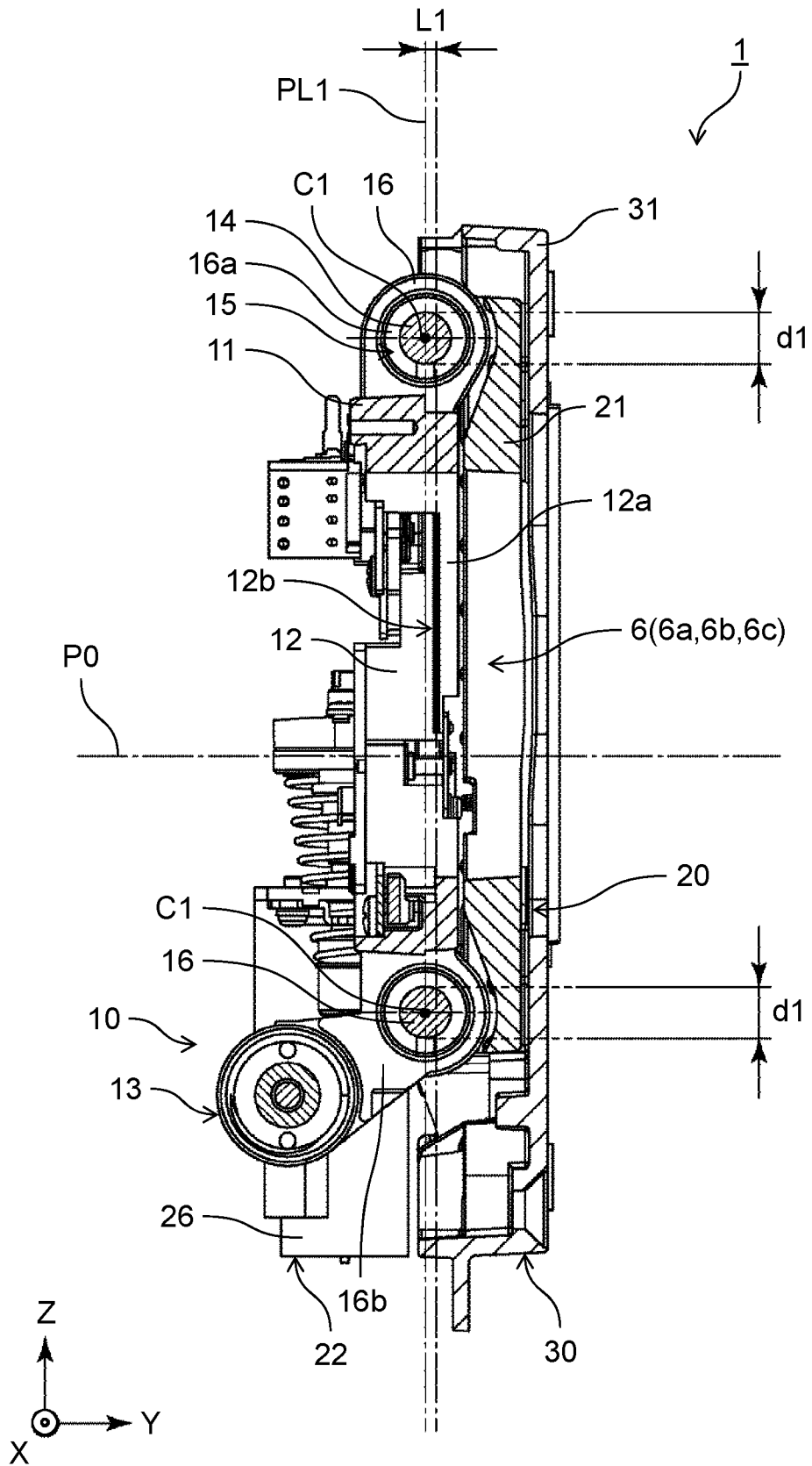
FIG. 6 is a cross-sectional view of the lens retaining device of FIG. 4 taken along line VI-VI.

FIG. 6 is a cross-sectional view of lens retaining device 1 of FIG. 4 taken along line VI-VI. As illustrated in FIG. 6, contact surfaces 12*b* of the plurality of ribs 12*a* of lens retainer 12 are disposed at positions close to shaft centers C1 of first shafts 14 in the optical axis direction (Y-direction). Shaft centers C1 of first shafts 14 mean the centers of circular first shafts 14 when viewed in the first direction D1 (X-direction).

Here, when viewed in the first direction D1 (X-direction), a plane perpendicular to the optical axis direction and including shaft centers C1 of first shafts 14 is defined as first virtual plane PL1. In the present exemplary embodiment, first virtual plane PL1 is an XZ-plane passing through shaft centers C1 of two first shafts 14. A first distance L1 between first virtual plane PL1 and contact surfaces 12b is smaller than a diameter d1 of first shafts 14. Preferably, the first distance L1 is smaller than ½ times the diameter d1 of first shafts 14. More preferably, the first distance L1 is smaller than ⅓ times the diameter d1 of first shafts 14. The first distance L1 means a distance between first virtual plane PL1 and contact surfaces 12b in the optical axis direction (Y-direction).

FIG. 7 is a cross-sectional view of lens retaining device 1 of FIG. 4 taken along line VII-VII. As illustrated in FIG. 7, contact surfaces 12b of the plurality of ribs 12a of lens retainer 12 are disposed at positions close to shaft centers C2 of second shafts 23 in the optical axis direction (Y-direction). Shaft centers C2 of second shafts 23 mean the centers of circular second shafts 23 when viewed in the second direction D2 (Z-direction).

Here, when viewed in the second direction D2 (Z-direction), a plane perpendicular to the optical axis direction and including shaft centers C2 of second shafts 23 is defined as second virtual plane PL2. In the present exemplary embodiment, second virtual plane PL2 is an XZ-plane passing through shaft centers C2 of two second shafts 23. A second distance L2 between second virtual plane PL2 and contact surfaces 12b is smaller than twice a diameter d2 of second shafts 23. Preferably, the second distance L2 is smaller than 3/2 times the diameter d2 of second shafts 23. More preferably, the second distance L2 is smaller than the diameter d2 of second shafts 23. The second distance L2 means a distance between second virtual plane PL2 and contact surfaces 12b in the optical axis direction (Y-direction).

[1-3. Advantageous Effects]

Lens retaining device 1 of the present disclosure includes: first shifter 10 movable in the first direction D1; and second shifter 20 that supports first shifter 10 and is movable in the second direction D2. First shifter 10 includes: first main body 11 movable in the first direction D1; lens retainer 12 that is provided on first main body 11 and retains projection lens 2; and first drive portion 13 that moves first main body 11. Lens retainer 12 is formed integrally with first main body 11. Such a configuration makes it possible to improve positional accuracy of projection lens 2. Lens retaining device 1 of the present disclosure can improve mechanical strength as compared with a case where first main body 11 and lens retainer 12 are formed as separate members. Since the number of components and the number of manufacturing steps can be reduced, the manufacturing cost can be reduced. Since lens retainer 12 is formed integrally with first main body 11, dimensional accuracy can be improved.

First main body 11 and lens retainer 12 are made of a metal material. For example, as the metal material, an aluminum alloy or a magnesium alloy can be used. Such a configuration makes it possible to further improve the mechanical strength of lens retainer 12 as compared with a lens retainer made of a plastic material. By using a metal material, which has a lower thermal expansion coefficient than plastic materials, it is possible to improve resistance to environmental factors and temperature changes. Further, metal materials are less likely to deteriorate than plastic materials, and the positional accuracy and focus of projection lens 2 can be improved.

In lens retaining device 1, when viewed in the first direction D1, the first distance L1, which is between first virtual plane PL1 perpendicular to the optical axis direction and including shaft centers C1 of first shafts 14 and contact surfaces 12b of lens retainer 12, is smaller than the diameter d1 of first shafts 14. Such a configuration makes it possible to dispose first shafts 14 near contact surfaces 12b of lens retainer 12. Contact surfaces 12b are surfaces that are in contact with the end surface on the second end side of projection lens 2 to support projection lens 2. Projection lens 2 is retained, in a cantilever state, on the second end on which projection lens 2 is in contact with contact surfaces 12b. Since first main body 11 of first shifter 10 moves while being guided by first shafts 14, the positional accuracy of projection lens 2 can be improved by disposing contact surfaces 12b supporting projection lens 2 and first shafts 14 to be close to each other.

In lens retaining device 1, when viewed in the second direction D2, the second distance L2, which is between contact surfaces 12b and second virtual plane PL2 perpendicular to the optical axis direction and including shaft centers C2 of second shafts 23, is smaller than twice the diameter d2 of second shafts 23. This configuration makes it possible to dispose second shafts 23 near contact surfaces 12b of lens retainer 12. Since second main body 21 of second shifter 20 moves while being guided by second shafts 23, the positional accuracy of projection lens 2 can be improved by disposing contact surfaces 12b supporting projection lens 2 and second shafts 23 to be close to each other.

A projection display apparatus including lens retaining device 1 has the same effect as lens retaining device 1.

Note that, the present exemplary embodiment has described an example in which lens retaining device 1 retains projection lens 2, but the present disclosure is not limited to such an example. Lens retaining device 1 may be a device that retains a lens other than projection lens 2.

The present exemplary embodiment has described an example in which lens retaining device 1 includes base 30, but the present disclosure is not limited to such an example. Base 30 is not an essential component.

The present exemplary embodiment has described an example in which the first direction D1 in which first shifter 10 moves is the X-direction and the second direction D2 in which second shifter 20 moves is the Z-direction, but the present invention is not limited to such an example. For example, the first direction D1 may be the Z-direction, and the second direction D2 may be the X-direction.

The present exemplary embodiment has described an example in which projection display apparatus 100 includes lens retaining device 1, projection lens 2, optical unit 3, and controller 4; however, the present disclosure is not limited to such an example. Projection display apparatus 100 may include elements other than these elements.

As described above, the exemplary embodiment has been described to exemplify the techniques in the present disclosure. For this purpose, the accompanying drawings and the detailed description have been provided. Therefore, in order to illustrate the above techniques, the components described in the accompanying drawings and the detailed description can include not only the components necessary to solve the problem but also components unnecessary to solve the problem. For this reason, it should not be immediately recognized that those unnecessary components are necessary just because those unnecessary components are described in the accompanying drawings and the detailed description.

The above exemplary embodiment is provided to exemplify the techniques according to the present disclosure. Therefore, it is possible to make various changes, replacements, additions, omissions, and the like, within the scope of the claims and equivalents thereof.

(Outline of Exemplary Embodiment)

Item (1): A lens retaining device of the present disclosure includes: a first shifter that holds a lens and moves in a first direction perpendicular to an optical axis direction of the lens; and a second shifter that supports the first shifter and moves in a second direction perpendicular to the optical axis direction and the first direction. The first shifter includes: a first main body moves in the first direction; a lens retainer that is provided on the first main body and retains the lens; and a first drive portion that moves the first main body. The lens retainer is integrally formed with the first main body.

Item (2): In the lens retaining device of item (1), the first main body and the lens retainer may be made of a metal material.

Item (3): In the lens retaining device of item (2), the metal material may contain an aluminum alloy or a magnesium alloy.

Item (4): The lens retaining device of any one of items (1) to (3) may have the following configuration. The first shifter includes a first shaft that is fixed to the second shifter and guides movement of the first main body; the first main body includes a first shaft retainer disposed along the first direction and provided with a first shaft hole that the first shaft is disposed in; the lens retainer has a contact surface that is perpendicular to the optical axis direction and is in contact with the lens; the first drive portion includes a first actuator that applies force to move the first main body in the first direction; and when viewed in the first direction, a first distance between the contact surface and a first virtual plane that is perpendicular to the optical axis direction and includes a shaft center of the first shaft is smaller than a diameter of the first shaft.

Item (5): In the lens retaining device of item (4), the first distance may be smaller than ½ of the diameter of the first shaft.

Item (6): In the lens retaining device of item (4) or (5), the second shifter may include: a second main body that moves in the second direction; and a second drive portion that moves the second main body.

Item (7): The lens retaining device of item (6) may have the following configuration. The second shifter includes a second shaft that guides movement of the second main body; the second main body includes a second shaft retainer disposed along the second direction and provided with a second shaft hole that the second shaft is disposed in; the second drive portion includes a second actuator that applies force to move the second main body in the second direction; and when viewed in the second direction, a second distance between the contact surface and a second virtual plane that is perpendicular to the optical axis direction and includes a shaft center of the second shaft is smaller than twice a diameter of the second shaft.

Item (8): The lens retaining device of any one of items (1) to (7) may further include a base that supports the second shifter.

Item (9): A projection display apparatus according to the present disclosure includes the lens retaining device of any one of items (1) to (8).

The present disclosure is applicable to a lens retaining device capable of adjusting a position of a lens, and is applicable to a projection display apparatus that projects a video.

What is claimed is:

1. A lens retaining device comprising:
    a first shifter that holds a lens and moves in a first direction perpendicular to an optical axis direction of the lens; and
    a second shifter that supports the first shifter and moves in a second direction perpendicular to the optical axis direction and the first direction, wherein
    the first shifter includes:
        a first main body that moves in the first direction;
        a first shaft that is fixed to the second shifter and guides movement of the first main body;
        a lens retainer that is provided on the first main body and retains the lens; and
        a first drive portion that moves the first main body,
    the lens retainer is integrally formed with the first main body,
    the first main body includes a first shaft retainer disposed along the first direction and provided with a first shaft hole that the first shaft is disposed in,
    the lens retainer has a contact surface that is perpendicular to the optical axis direction and is in contact with the lens,
    the first drive portion includes a first actuator that applies force to move the first main body in the first direction, and
    when viewed in the first direction, a first distance between the contact surface and a first virtual plane that is perpendicular to the optical axis direction and includes a shaft center of the first shaft is smaller than a diameter of the first shaft.

2. The lens retaining device according to claim 1, wherein the first main body and the lens retainer are made of a metal material.

3. The lens retaining device according to claim 2, wherein the metal material contains an aluminum alloy or a magnesium alloy.

4. The lens retaining device according to claim 1, wherein the first distance is smaller than ½ of the diameter of the first shaft.

5. The lens retaining device according to claim 1, wherein the second shifter includes:
    a second main body that moves in the second direction; and
    a second drive portion that moves the second main body.

6. The lens retaining device according to claim 5, wherein the second shifter includes a second shaft that guides movement of the second main body,
    the second main body includes a second shaft retainer disposed along the second direction and provided with a second shaft hole that the second shaft is disposed in,
    the second drive portion includes a second actuator that applies force to move the second main body in the second direction, and
    when viewed in the second direction, a second distance between the contact surface and a second virtual plane that is perpendicular to the optical axis direction and includes a shaft center of the second shaft is smaller than twice a diameter of the second shaft.

7. The lens retaining device according to claim 1, further comprising a base that supports the second shifter.

8. A projection display apparatus comprising the lens retaining device according to claim 1.

9. A lens retaining device comprising:
a first shifter that holds a lens and moves in a first direction intersecting an optical axis direction of the lens; and
a second shifter that supports the first shifter and moves in a second direction intersecting the optical axis direction and the first direction, wherein
the first shifter includes:
- a first main body that moves in the first direction;
- a first shaft that is fixed to the second shifter and guides movement of the first main body;
- a lens retainer that is provided on the first main body and retains the lens; and
- a first drive portion that moves the first main body, the lens retainer is integrally formed with the first main body,
the first main body includes a first shaft retainer disposed along the first direction and provided with a first shaft hole that the first shaft is disposed in,
the lens retainer has a contact part that is perpendicular to the optical axis direction and is in contact with the lens,
the first drive portion includes a first actuator that applies force to move the first main body in the first direction, and
when viewed in the first direction, a first distance between the contact part and a first virtual plane that is perpendicular to the optical axis direction and includes a shaft center of the first shaft is smaller than a diameter of the first shaft.

10. A projection display apparatus comprising the lens retaining device according to claim 9.

* * * * *